(12) United States Patent
Kusumoto

(10) Patent No.: US 6,975,630 B1
(45) Date of Patent: Dec. 13, 2005

(54) SYSTEM AND METHOD OF AVOIDING CELL DISPOSAL IN BUFFER

(75) Inventor: Yuichi Kusumoto, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 1016 days.

(21) Appl. No.: 09/718,378

(22) Filed: Nov. 24, 2000

(30) Foreign Application Priority Data

Nov. 26, 1999 (JP) ................................. 11-336638

(51) Int. Cl.[7] .......................................... H04L 12/28
(52) U.S. Cl. ............................... 370/395.41; 370/395.7
(58) Field of Search ...................... 370/395.41–395.43, 370/357–360, 389, 391, 395.1, 395.4, 395.7, 370/395.71, 398, 399

(56) References Cited

U.S. PATENT DOCUMENTS

| | | | |
|---|---|---|---|
| 5,231,633 A * | 7/1993 | Hluchyj et al. | 370/429 |
| 5,696,764 A * | 12/1997 | Soumiya et al. | 370/395.41 |
| 5,872,769 A * | 2/1999 | Caldara et al. | 370/230 |
| 5,918,017 A * | 6/1999 | Attanasio et al. | 709/224 |
| 6,317,416 B1 * | 11/2001 | Giroux et al. | 370/232 |
| 6,408,005 B1 * | 6/2002 | Fan et al. | 370/412 |
| 6,412,005 B1 * | 6/2002 | Bennett | 709/226 |
| 6,438,135 B1 * | 8/2002 | Tzeng | 370/412 |
| 6,480,911 B1 * | 11/2002 | Lu | 710/54 |
| 6,556,572 B1 | 4/2003 | Ishida | |

FOREIGN PATENT DOCUMENTS

| | | |
|---|---|---|
| JP | 7-79252 | 3/1995 |
| JP | 10-70547 | 3/1998 |
| JP | 11-275112 | 10/1999 |

* cited by examiner

*Primary Examiner*—Hassan Kizou
*Assistant Examiner*—Dmitry Levitan
(74) *Attorney, Agent, or Firm*—Harrity & Snyder, LLP

(57) ABSTRACT

A cell disposal avoidance system is provided that can avoid disposal of cells resided in the QoS buffer when a traffic of a specified QoS class in an ATM switch increases. The ATM switch includes a storage cell number monitor, a software data section 813, and a software controller 812. The storage cell number monitor monitors congestion of plural QoS buffers in the buffer 3, 5. The software data section 813 stores a cell reading priority (WRR value) attached for each QoS buffer. The software controller 812 dynamically changes the WRR value when congestion of a QoS buffer is in a congestion state (at generation of cell disposal or buffer congestion alarm) and increases the WRR value of the QoS buffer in a cell disposal state. Cells are divided in a time division mode according to the weight of the WRR value and read in a round format from the QoS buffer. The ATM switch resets the WRR value to an initial value when the congestion of the QoS buffer ceases.

20 Claims, 7 Drawing Sheets

J1. CELL DISPOSAL DETECTION

J2. WRR VALUE CHANGE

J3. CELL DISPOSAL HALT, ALARM RELEASE, AND WRR VALUE INITIALIZATION

QoS BUFFER  ★ CELL DISPOSAL ORDER AND ALARM  → CELL FLOW

WRR SCHDULING FUNCTION (NUMERAL VALUE IS WRR VALUE)

CELL READING FUCNTION

☆ : OCCURRENCE OF CELL DISPOSAL OR BUFFER CONGESTION ALARM

SYSTEM AND METHOD OF AVOIDING CELL DISPOSAL IN BUFFER

BACKGROUND OF THE INVENTION

The present invention is related to a system or method of avoiding cell disposal in a buffer that reads cells out of a category buffer for cell storage, inside an ATM switch. Particularly, the present invention is related to a cell disposal avoidance system or method in a buffer that performs cell disposal by changing the reading speed at which a cell is read out from a category buffer.

The conventional cell disposal system of the above-mentioned type is employed as the system including buffers classified by QoS (Quality of Service) class. This system implements cell congestion control by changing the buffer size for each QoS class.

Moreover, JP-A No. 70547/1998, for example, discloses the above-mentioned conventional cell disposal system in which the input buffer has priority for transmission. This system includes plural input buffers corresponding to input ports, an ATM switch, plural output buffers, and an input buffer controller. The input buffer controller controls input buffers so as to exchange information on a degree of congestion in each input buffer between them. If there is an input buffer in a congestion state, the input buffer controller regulates transmission from input buffers in congestion state and gives the input buffer in the congestion state a priority for transmission. Moreover, the input buffer controller checks input buffers exceeding a threshold by output buffer and informs each input buffer of these sets of information. Each input buffer includes a stopper. The stopper performs discrimination based on information from an input-buffer-congestion-information collection and notification unit residing, with the threshold overshot, and ceases to transmit cells when the number of residence cells among cells to be transmitted to the corresponding output buffer does not exceed the threshold.

However, the conventional system including buffers for each QoS class has the disadvantage in that it is difficult to avoid the cell disposal in advance because when the traffic of a specific QoS class increases, the buffer size merely changes but the cell flow remains unchanged. Moreover, this conventional system cannot dynamically control congestion while monitoring cell disposal.

JP A No. 70547/1998, for example, discloses the system in which the input buffer has a priority for transmission. However, this system is not applicable to the input buffer-type ATM switch or output buffer-type ATM switch because the input buffer is linked with the output buffer. Moreover, in the above-mentioned technique, congestion is detected by periodically exchanging information on congestion conditions between the input buffer and the output buffer. Hence, there is the disadvantage in that the processing capability of the microprocessor decreases. Moreover, regarding the above-mentioned technique, the preferential transmission of the input buffer results in completely controlling and interrupting reading cells out of an input buffer in no cell disposal state when an input buffer generates cell disposal. Therefore, there is the problem in that when a congestion state continues, the input buffer in a cease state is involved in congestion.

SUMMARY OF THE INVENTION

The present invention is made to overcome the above-mentioned problems.

An objective of the present invention is to provide a cell disposal avoidance system that can previously avoid disposal of cells resided in the QoS buffer even if a specific QoS class traffic increases in an ATM switching system.

In order to achieve the above mentioned objective, in a cell disposal avoidance system in a first buffer, the buffer including category buffers classified by category in an ATM switching, the category buffers each for storing a cell, the buffer reading out the cell, the system comprises a weight representing the priority that determines the reading rate for each of the category buffers; a reader for laying out allocation in a time division mode according to said priority mode, the allocation being read out of each of the category buffers when a cell in a buffer is read out, and reading out the allocation in a round-robin format; a detector for detecting cell disposal of the buffer; and a controller for changing to a higher weight of a priority mode in a buffer in a cell disposal state detected by the detector.

Moreover, the cell disposal avoidance system further comprises a first resetting unit for resetting a weight representing the priority mode of the buffer when the cell disposal of the buffer is stopped.

Moreover, a priority mode changed by said controller and an initial priority mode before changing are informed a maintenance terminal.

Moreover, the cell disposal avoidance system further comprises an informer for informing the maintenance terminal of the fact that the buffer in a cell disposal state has stopped its cell disposal; and a second resetting unit for resetting a weight representing the priority mode of the buffer in a cell disposal state by commands input by the informer.

According to the present invention, in a cell disposal avoidance system in a second buffer, the buffer including category buffers classified by category in an ATM switch, the category buffers each for storing a cell, the buffer reading out the cell, the system comprises a priority mode representing a weight of a reading rate to each of the category buffers at a cell reading time; a reader for laying out allocation in a time division mode according to the priority mode, the allocation being read out of each of the category buffers when a cell in a buffer is read out, and reading out the allocation in a round-robin format; a detector for detecting the fact that the capacity of the buffer exceeds a first threshold; and a first controller for changing to a higher value the weight of a priority mode of a buffer which exceeds the threshold detected by the detector.

Moreover, the cell disposal avoidance system further comprises a first resetting unit, when the capacity of a buffer exceeding the first threshold reaches a second threshold, for resetting the priority mode of the buffer to an initial weight.

Moreover, the cell disposal avoidance system further comprises a second controller, when the capacity of a buffer exceeding the first threshold reaches a third threshold value being less than the first threshold, for setting the priority mode of the buffer to a weight lower than that of the first controller.

Moreover, a priority mode changed by said first or second controller and an initial priority mode before changing are informed a maintenance terminal.

Moreover, the cell disposal avoidance system further comprises an informer for informing the maintenance terminal of the fact that the capacity of the buffer exceeding the first threshold reaches the second threshold; and second resetting unit for resetting to an initial weight the priority mode of a buffer exceeding the first threshold, by a command input by the informer.

Moreover, in the cell disposal avoidance system, the category represents the type of QoS class in accordance with a header within an area of the cell and a path set in the area.

In a cell disposal avoidance method suitable in a first buffer, the buffer including category buffers classified by category in an ATM a switch, the category buffers each for storing a cell, the buffer reading out the cell, the method comprises the steps of setting to a higher level a cell reading priority of a buffer in which cell disposal occurs in congestion of the buffer; and changing a period during which cells are read from a buffer in a cell disposal state, in accordance with a priority allocated to each of the category buffers, to speed the reading rate of the buffer.

Moreover, the cell disposal avoidance method further comprises the steps of resetting, when said buffer in which cell disposal occurs stops cell disposal, the cell reading priority of the buffer to an initial value; and resetting a period during which a cell is read out of each of the category buffers to an initial state, according to a priority allocated to each of the category buffers.

Moreover, when cell disposal occurs in a category buffer, the cell disposal avoidance system further comprises the step of informing a maintenance terminal of a priority after change of the category buffer and a priority with an initial value.

Moreover, when a buffer in a cell disposal occurrence state stops its cell disposal, the cell disposal avoidance system further comprises the step of informing a maintenance terminal of a cease of the cell disposal.

Moreover, the cell disposal avoidance method further comprises the steps of, when the maintenance terminal inputs a command for resetting to an initial value after the maintenance terminal has received information on a cease of cell disposal, resetting to an initial value a cell reading priority of the buffer in a cell disposal halt state; and resetting a period during which a cell is read out of each of the category buffers, to an initial state, in accordance with a priority allocated to each of the category buffers.

In a cell disposal avoidance method suitable for a second buffer, the buffer including category buffers classified by category in an ATM a switch, the category buffers each for storing a cell, the buffer reading out the cell, the method comprises the steps of, when the capacity of the buffer exceeds a first threshold, setting to a higher level a cell reading priority of the buffer; and changing a period during which a cell is read out of a buffer exceeding the first threshold, in accordance with a priority allocated to each of the category buffers, to speed a reading speed of the buffer in a cell disposal state.

Moreover, the cell disposal avoidance method defined further comprises the steps of, when it is detected that the capacity of the buffer exceeding the first threshold reaches a second threshold, resetting the cell reading priority of the buffer to an initial value; and resetting a period during which a cell is read out of each of the category buffers, to an original state, in accordance with a priority allocated to each of the category buffers.

Moreover, the cell disposal avoidance system further comprises the step of, when the capacity of a buffer exceeding the first threshold reaches a third threshold being lower than the first threshold, setting the priority mode of the buffer to a threshold lower than a value set when the capacity of the buffer exceeds the first threshold.

Moreover, the cell disposal avoidance system further comprises the step of, when a category buffer exceeds the first threshold, informing a maintenance terminal of a priority after change of the buffer which has exceeded the first threshold and a priority with an initial value.

Moreover, the cell disposal avoidance system further comprises the step of, when a buffer exceeding the first threshold stops exceeding a second threshold, informing a maintenance terminal of the fact that the buffer has ceased cell disposal.

Moreover, the cell disposal avoidance system further comprises the step of, when the maintenance terminal inputs a command for resetting to an initial value after the maintenance terminal has received information on a cease of exceeding the second threshold, resetting a cell reading priority of a buffer which has exceeded the threshold, to an initial value; and resetting a period during which a cell is read out of each of said category buffers, to an original value, in accordance with a priority of each of the category buffers.

Moreover, in the cell disposal avoidance system according to the present invention, the category represents the type of QoS class in accordance with a header within an area of the cell and a path set.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Embodiments of the present invention will be described below with reference to the attached drawings.

Figure 2:
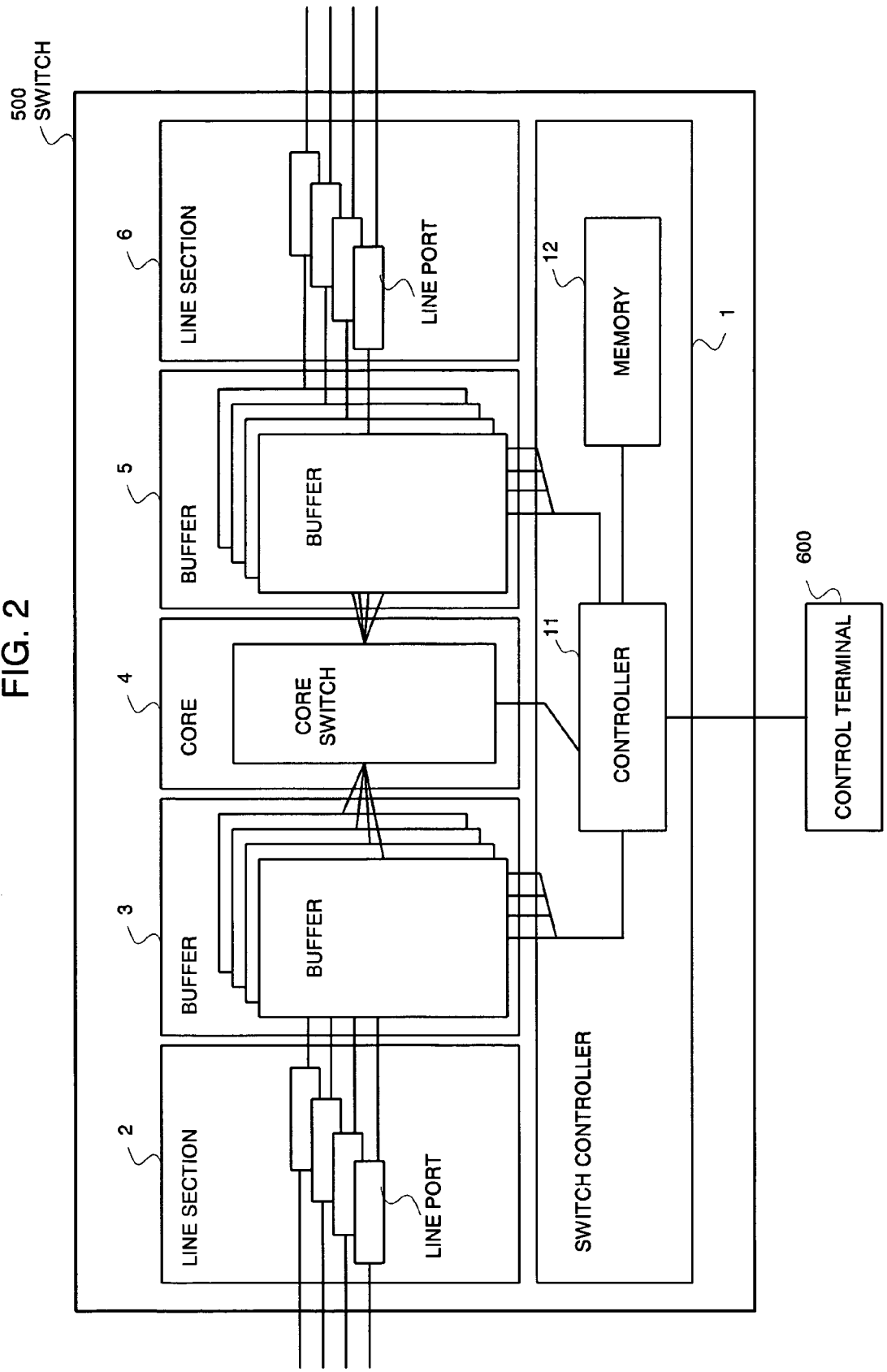
FIG. 2 is? a block diagram illustrating the system configuration of a switch in the input/output format according to an embodiment of the present invention.

FIG. 2 is a block diagram illustrating the system configuration of a switch in an input/output buffer format, according to an embodiment of the present invention. This system comprises a switch 500 and a control terminal 600 (maintenance terminal) for performing an input/output operation during maintenance.

The control terminal 600 is used for the purpose of the maintenance for a switch. The control terminal 600 is a terminal of informing an operator of information for maintenance and implements, if necessary, various settings. A personal computer may be connected as the control terminal 600.

The switch 500 includes a switch controller 1, a line section 2 having plural input line ports, a buffer 3 having plural QoS buffers on the input side, a core 4 acting as a core switch, a buffer 5 having plural QoS buffers on the output side, and a line section 6 having plural output line ports.

The switch controller 1 is configured of a controller 11 that operates under program control by a processor (not shown) and a storage unit 12 that stores programs and office data (having a cell reading priority of each QoS buffer).

The buffer 3 shows the configuration for plural buffers connected correspondingly to line ports of the line section 2. Each of the line sections 2 is configured of QoS buffers being category buffers.

The buffer 5 shows the configuration for plural buffers connected correspondingly to line ports of the line section 6. Each of the line sections 6 is configured of QoS buffers being category buffers.

Figure 1:
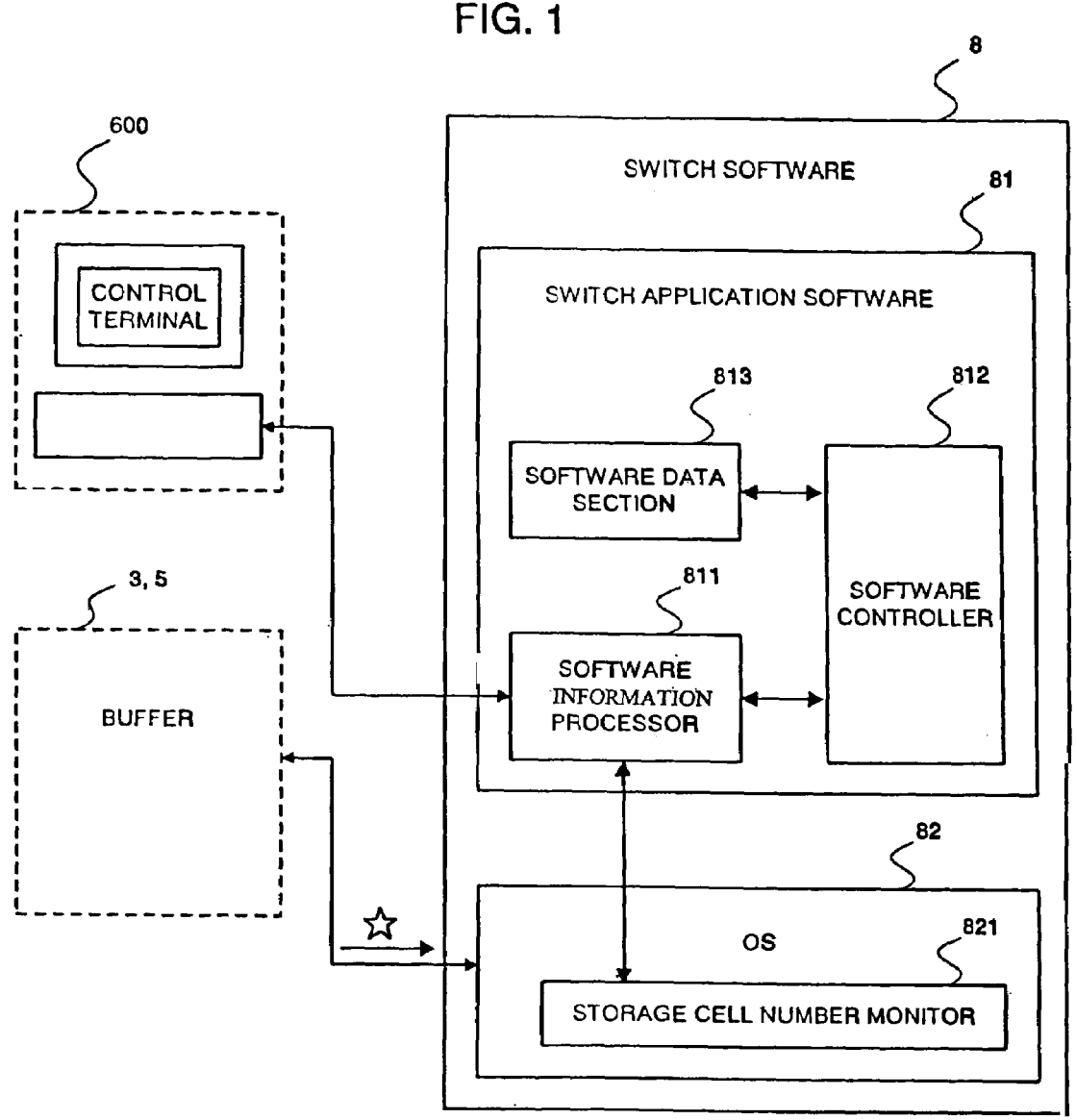
FIG. 1 is a functional block diagram illustrating the case where the switch controller of FIG. 2 executes a program stored in a storage unit.

FIG. 1 is a function block diagram illustrating the function of a switch software 8. In this diagram, after the controller 11 in the switch controller 1 in FIG. 2 executes a program stored in the storage unit 12, cells saved in the QoS buffer within the buffer 3, 5 are monitored and read. The switch software 8 includes a switch application software 81 and OS (Operating System) 82.

The switch application software 81 includes a software information processor 811 for receiving cell disposal or the like from a storage cell number monitor 821 and communicating with the switch control terminal, a software controller 812 for calculating a cell reading priority, and a software data section 813 storing office data of a switch (secured as an area within the storage unit 12).

OS 82 includes the storage cell number monitor 821 for monitoring the number of cells stored in a QoS buffer within the buffer 3, 5.

Figure 3:
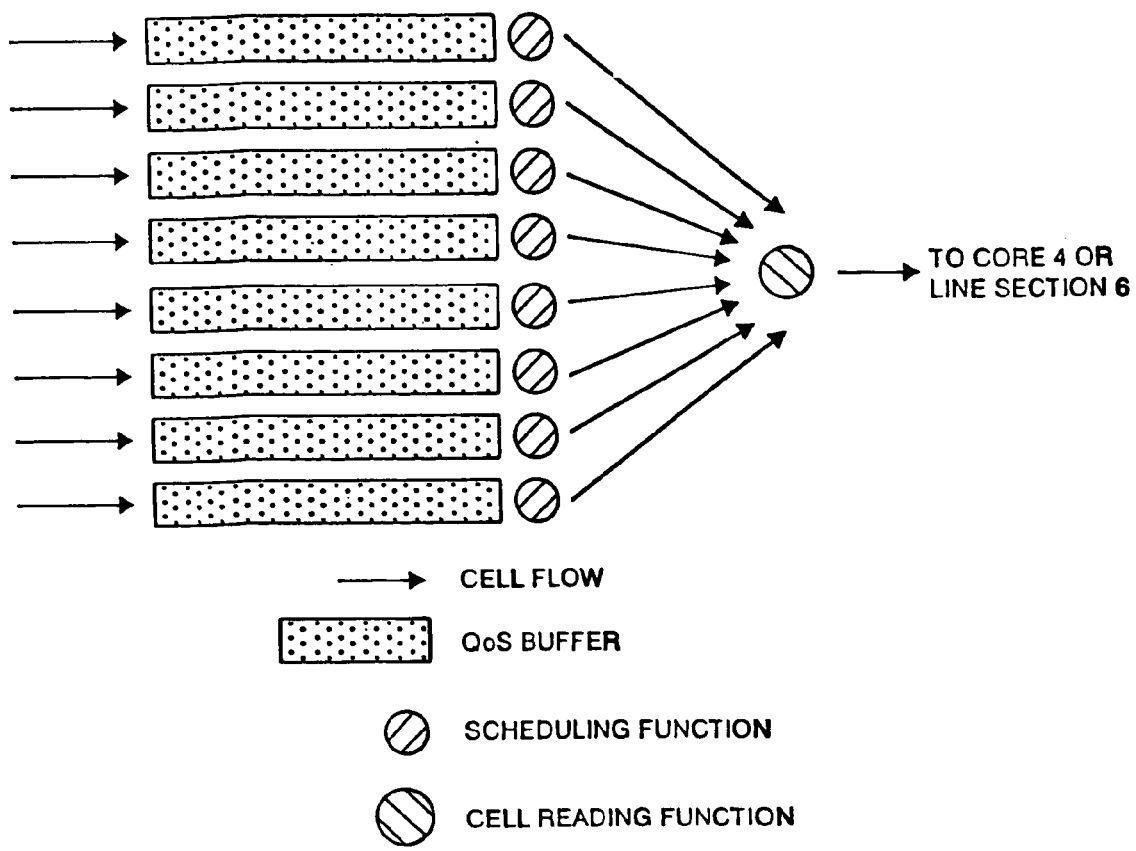
FIG. 3 is a schematic diagram illustrating a buffer system at the reading time of a QoS buffer in the buffer shown in FIG. 2.

FIG. 3 is a schematic diagram illustrating a buffer system at the time of reading a QoS buffer in the buffer 3 or 5 shown in FIG. 2. Each buffer has plural QoS buffers in a FIFO (First-in First-out) mode which respectively acquires the traffics of different QoS classes, a function of scheduling the time of reading cells from each QoS buffer, and a function of reading cells from all QoS buffers. The QoS buffer system can be employed either on input or output side of an ATM a switch (in an input buffer mode or output buffer mode) or on input and output sides thereof (in an input/output mode). The input buffer mode (buffer 3) means that the buffer stands before a cell relayed and transferred from a different switch or terminal (an end user terminal) is transferred to the core for actual switch. The output buffer mode (buffer 5) means that the buffer stands before a cell is transferred to the line connected to a difference switch or terminal. The input/output buffer means that buffers are mounted on the input side and the output side.

The buffer, shown in FIG. 3 (each of the buffers 3 and 5 of FIG. 2), employs the WRR (Weighted Round Robin) reading mode as the scheduling function. That is, a ratio of the weight representing priority, or the cell reading rate, among QoS buffer is distributed in a time division mode, based on the WRR value indicating the weight of a priority in a WRR reading mode laid out to each QoS buffer. The reading rate from each QoS buffer depends on the WRR value. A large WRR value leads to an increased of times of reading so that the QoS buffer reading rate becomes fast. Therefore, a larger WRR value results in a fast decreasing rate of the cell amount stored in the QoS buffer.

The line section 2, shown in FIG. 2, transmits cells to a QoS buffer in the buffer 3 corresponding to a QoS class specified upon establishing a call (for example, a service category defined by the ATM Forum). When a call is established, the path specified by a QoS class (or the path between the line port of the input line 2 and the line port of the output line 6) exists. For that reason, the line section 2 manages the type of QoS class for each path to distribute cells entering after the setting of a call to each QoS buffer.

Regarding the method to distribute transmitted cells to the corresponding QoS buffer, the line section 2 determines a corresponding QoS buffer through the information gathered upon establishing a path. In addition, the line section 2, analyzes the ATM cell header of each transmitted ATM cell in order to reconfirm the QoS buffer to be sent to. This type of cell distribution is applicable to the present invention.

The core 4, shown in FIG. 2, switches a cell received from the buffer 3 according to the header thereof and stores it into the QoS buffer in the QoS buffer 5 which belongs to the same QoS class as that of a QoS buffer in the buffer 3.

For example, the ATM Forum (an organization for Standardization) defines six types of service categories corresponding to a QoS class used in the present invention, —CBR (Constant Bit Rate), rt-VBR (Real-time Variable Bit Rate), nrt-VBR (Non-Real-time Variable Bit Rate), UBR (Unspecified Bit Rate), ABR (Available Bit Rate), and GFR (Guaranteed Flow Rate)—.

Next, the operation of the cell disposal avoidance system according to the present invention will be explained below by referring to FIGS. 1 to 7.

First, the whole operation and function of the cell disposal avoidance system will be explained below by referring first to FIGS. 4 and 5. In this example, it is assumed that a 5QoS; buffer system in the WRR reading mode is employed as a scheduling function.

Figure 4:
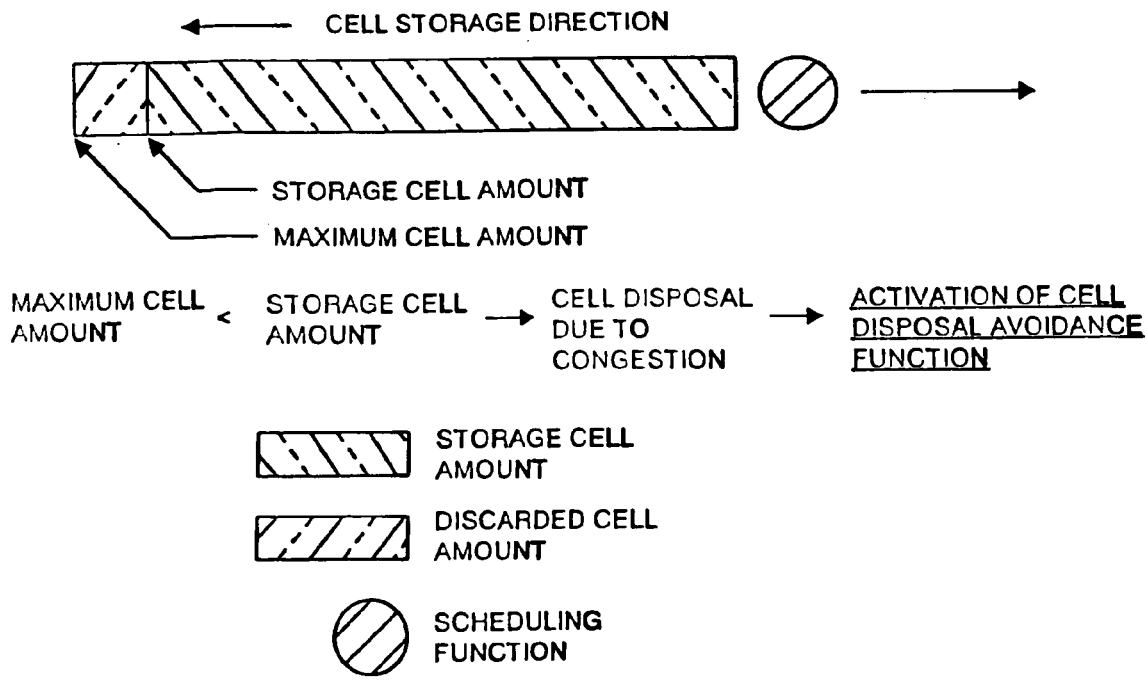
FIG. 4 is a schematic diagram illustrating the triggering of a cell disposal avoidance system due to cell disposal.

FIG. 4 depicts the procedure of cell disposal from a QoS buffer being a trigger to the cell disposal avoidance system. When the storage cell amount exceeds the buffer amount, the QoS buffer throws away the overflowed cells.

Figure 5:
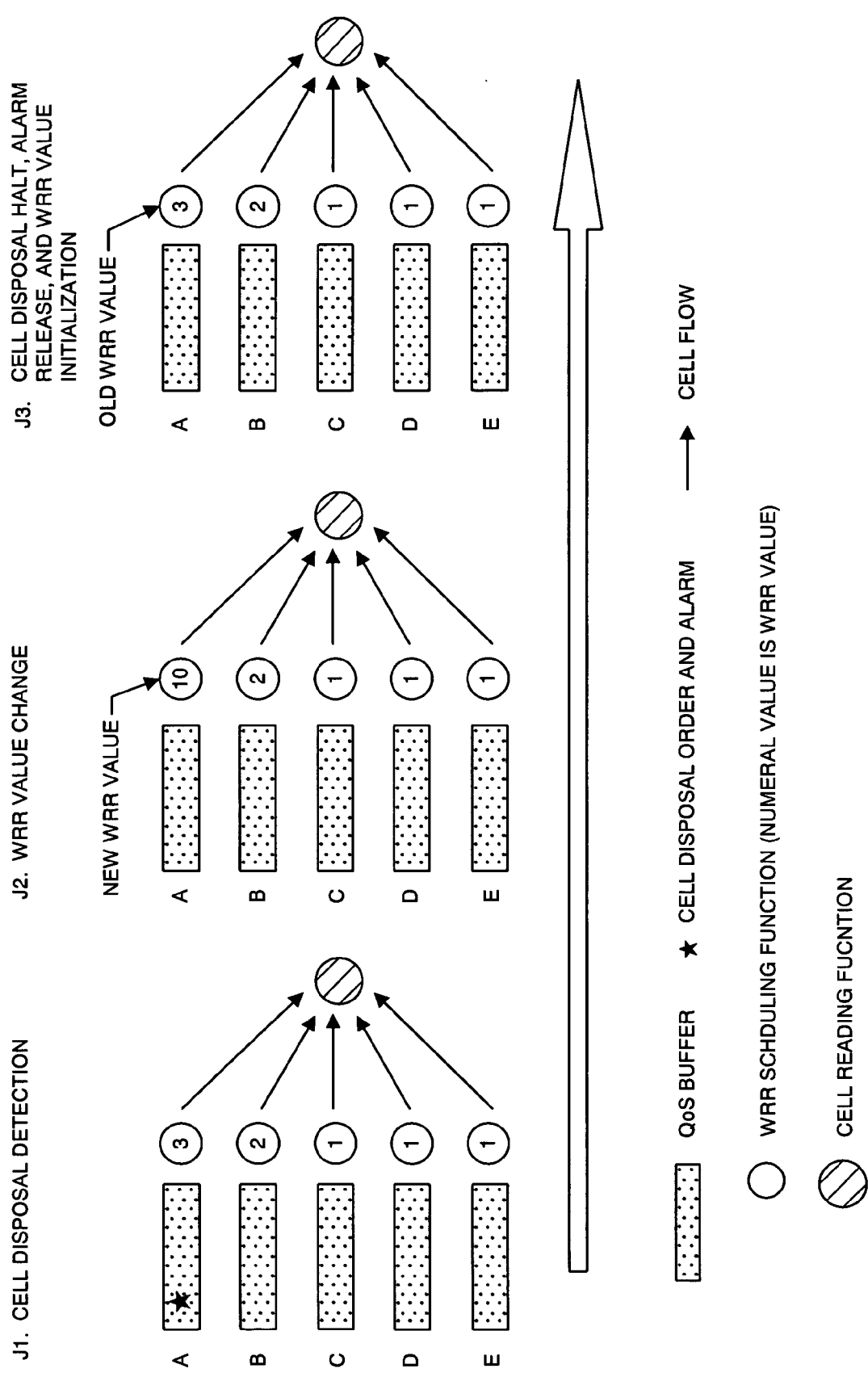
FIG. 5 is a schematic diagram illustrating a status transition in a cell disposal avoidance system.

Referring to FIG. 5, in the QoS buffer A, the WRR value is set to 3 as an initial value. In the QoS buffer B, the WRR value is set to 2 as an initial value. In the QoS buffers C, D, and E, the WRR value is set to 1 as an initial value. The initial value is set in a system configuration stage. For example, an operator enters the initial value through the control terminal 600 to save it in the software data section 813 (within the storage unit 12) in FIG. 2. The operator can change the initial WRR value through the control terminal 600. The table is divided for the buffers 3 and 5. In each table, the software data section 813 stores the WRR value corresponding to a current QoS buffer for each buffer (line port). The software data section 813 can be directly accessed from the buffer 3 or 5.

Attention is now paid on the QoS buffer A shown in FIG. 5. FIG. 5 is a status transition diagram. In this diagram, the status J1 shows a detection of cell disposal according to the cell disposal mode from the QoS buffer (explained with FIG. 4). The status J2 shows a cell disposal avoidance process started up and a WRR value changed. The status J3 shows cell disposal halt, alarm release, or initialization of a WRR value. That is, in the status J1, when the buffer 3 or 5 detects cell disposal, the controller 11 starts up the ATM software 8, in response to the detection, and executes the cell disposal avoidance process.

In the status J2, the controller 11 executes the switch software so that the WRR value of the QoS buffer A in a cell disposal state is changed from the initial value 3 to 10. Thus, the cell reading rate from the QoS buffer increases so that the storage cell amount of the QoS buffer A decreases. The control terminal 600 displays the cell reading rate change on its screen to inform the operator of it. Accordingly, the operator can see the changed status of the QoS buffer (or information containing the WRR value), which is displayed on the screen of the control terminal 600.

In the status J3, when the cell disposal ceases because of a decrease of the number of storage cells in the QoS buffer A, the switch software 8 resets the WRR value to an initial value, thus restoring the system in the normal operation. Moreover, the operator recognizes the normal operation through the control terminal 600. Thus the operation of the cell avoidance system is ended.

Next, let us compare the reading rate in the status J1 and the reading rate in the status J2, shown in FIG. 5. In the status J1 in which cells are read out in the round robin mode, the reading rate per period (eight readings per period) (distribution in a time division mode) of the QoS buffer A is three. The reading rate per period of the QoS buffer B is two. The reading rate per period of the QoS buffer C, D, or E is one. In the status J2 in which cells are read out in the round robin mode, the reading rate per period (15 readings per period) of the QoS buffer A is 10. The reading rate per period of the QoS buffer B is two. The reading rate per period of the QoS buffer C, D, or E is one. That is, when cell disposal is detected, the reading rate of the QoS buffer is speeded up from 3/8 per period to 10/15 per period.

Next, the case where cell disposal occurs will be explained below in accordance with the sequence flow of FIG. 6.

When cell disposal occurs in a QoS buffer within the buffer (3, 5), the buffer (3, 5) detects the cell QoS buffer in a cell disposal state, thus informing the controller 11 of it. The controller 11 detects the cell disposal through interruption and then analyzes the interruption factor. After the analysis, the controller 11 informs the storage cell number monitor 821 that cell disposal has occurred in the QoS buffer in the buffer 3 or 5. The storage cell number monitor 821 detects the specified QoS buffer in a cell disposal state (in which QoS buffer the cell disposal has happened), based on the notification from the buffer 3 or 5, and then informs the software information processor 811 of the cell disposal (sequence S1, S2).

Thereafter, the software information processor 811 spurs the software controller 812 to activate the cell disposal avoidance function (step S3). The software controller 812 reads a current WRR value set in the QoS buffer in the cell disposal state, out of the software data section 813, thus determines the new WRR value (steps S4 and S5). The new WRR value indicates a WRR value to be used in a cell disposal occurrence and is set to the software data section 813 in the system configuration, as performed with the initial WRR value.

As the above-mentioned method of calculating a new WRR value in a cell disposal time, the method may be employed of calculating a new value using an initial WRR value read out of the software data section 813 (for example, of doubling the initial value). Moreover, the method may be used of calculating a new WRR value using a current WRR value read out of the software data section 813 (for example, of doubling a current WRR value).

After calculation of a new WRR value, the software controller 812 informs the controller 11 of a WRR value setting change request through the software information processor 811. The cell controller 11 requests a change in WRR value to the buffer 3 or 5 in the cell disposal state (sequence S6).

In response to the WRR value setting change request, the buffer 3 or 5 changes the WRR value of the QoS buffer in cell disposal state stored in the software data section 813 to a new WRR value. Then the buffer 3 or 5 sends back the result to the (controller 11 (sequences S7 and S8).

The controller 11 informs the software controller 12 of the WRR value changed result via the software information processor 811. The software controller 812 informs the control terminal 600 of the result decision and then ends the cell disposal avoidance function (sequences S9 and S10). This means that the reading rate of the QoS buffer in cell disposal increases.

Figure 6:
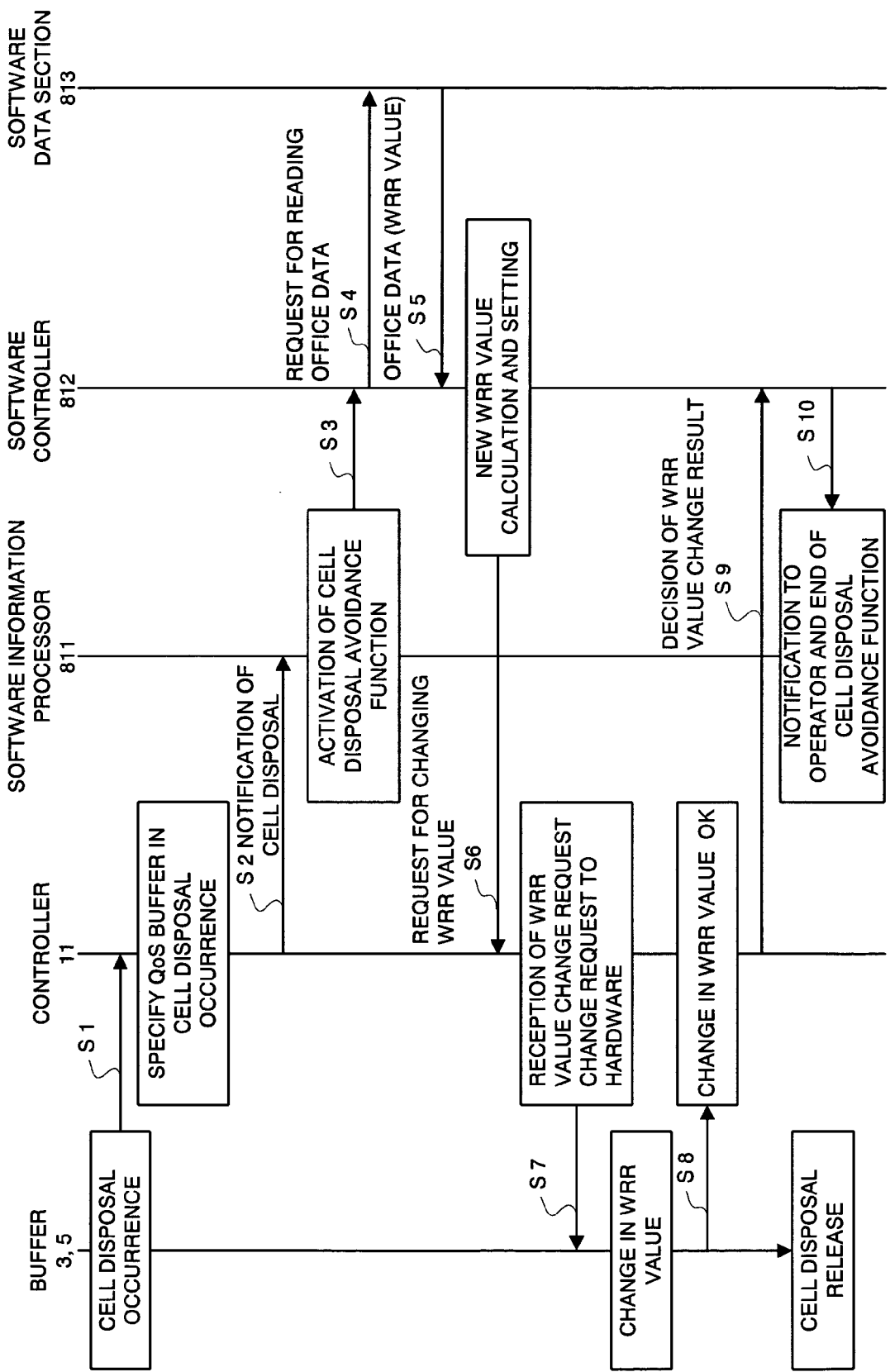
FIG. 6 is a diagram illustrating a sequence flow of a cell reading rate change function in an occurrence of cell disposal.

Referring to FIG. 6, after the software controller 812 has read new data in the process of the sequence S5, the WRR value of a QoS buffer stored in a table format in the software data section 813 may be directly changed to the new WRR value.

Figure 7:
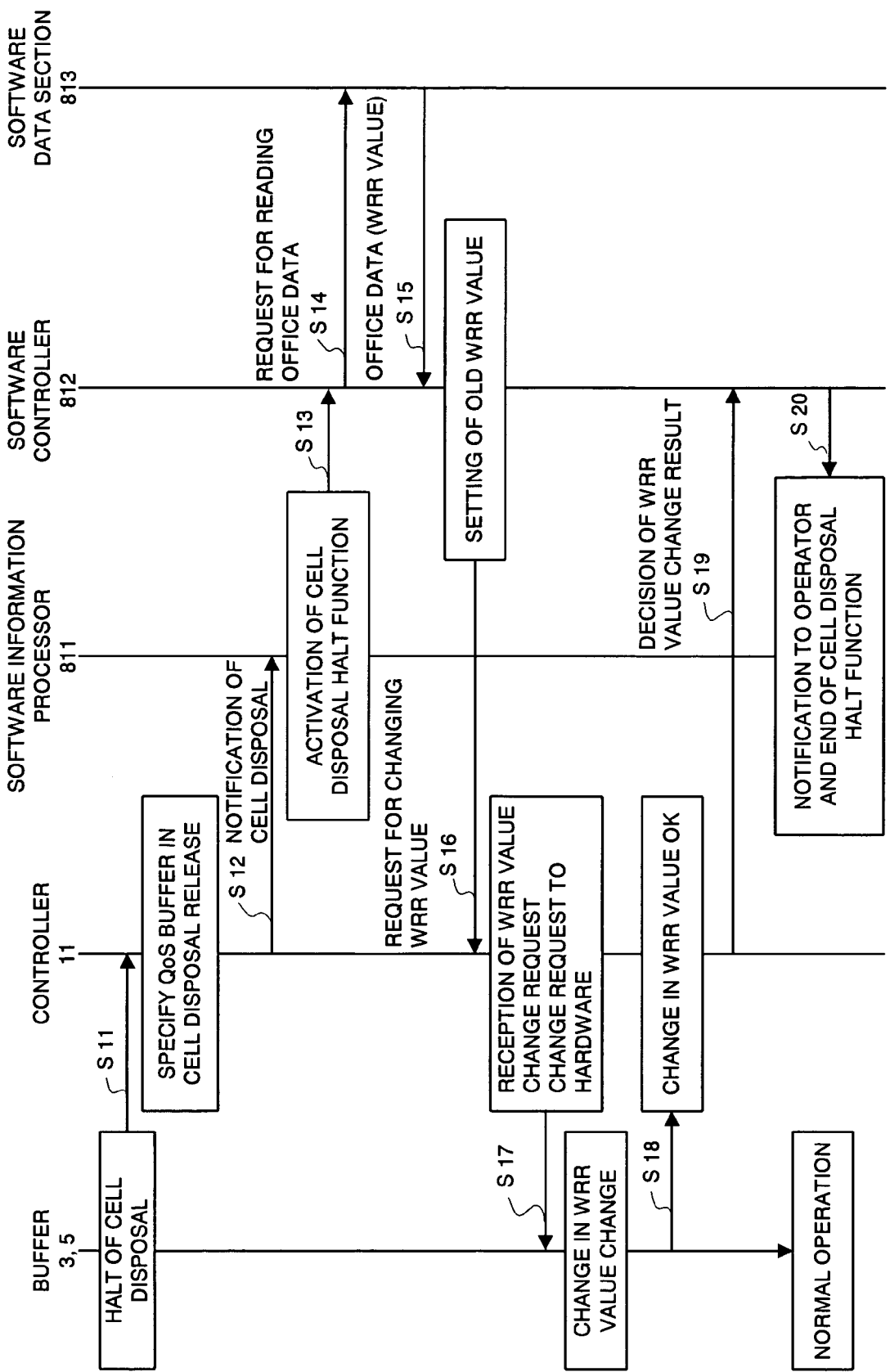
FIG. 7 is a diagram illustrating a sequence flow of a cell reading rate change function at a cell disposal halt time.

Next, a sequence of changing a cell reading rate at a cell disposal halt will be explained with reference to FIG. 7. This sequence is; basically similar to that in FIG. 6.

When an operator enters a command for ceasing cell disposal of a QoS buffer in a cell disposal state through the control terminal, based on the information indicated on the screen of the control terminal 600, the controller 11 analyzes it. In analysis, when the controller 11 recognizes a cease of cell buffer disposal, it hands over the control to the software information processor 811 (sequences S11 and S12 in FIG. 6).

The software information processor 811 informs the software controlled 812 of the control to start up the cell disposal halt function (step S13).

Thus, the software controller 812 reads the initial WRR value set in the QoS buffer in a cell disposal cease state out of the software data section 813 (sequences S14 and S15).

The software controller 812 informs the controller 11 of the cell with the initial WRR value, via the software information processor 811. The controller 11 requests the QoS buffer 3, 5 in a cell disposal cease state to change the setting of WRR value (sequence S16).

In response to the request for setting the WRR value, the buffer 3 or 5 changes to the initial value the WRR value of the QoS buffer in cell disposal state saved in the software data section 813 and then returns the result to the controller 11 (sequences S17 and S18).

The controller 11 informs the software controller 812 of the WRR value change result via the software information processor 811. In response to the decision, the software controller 812 ends the cell disposal halt function (sequences S19 and S20). That is, the QoS buffer, which has received the cell disposal halt, regains the same reading rate as that before the occurrence of cell loss, thus ending the system initialization.

In the step S1 of the cell disposal cease process, explanation has been made regarding the operation of changing the WRR to an initial value according to a command entry from the control terminal 600. However, the buffer 3 or 5 may automatically detect the cell disposal cease. For example, the value which is acquired by subtracting a storage cell amount (the currently saved buffer capacity) from a maximum cell amount (the maximum savable capacity of a buffer) may be less than a described value previously seat in the system configuration. In such a case, the buffer 3 or 5 transmits a cell disposal halt signal (for cell disposal alarm release) to the controller 11. The controller 11 detects the cell disposal halt signal and then hands over the control to the software information processor 811. The operation following the sequence S12 is similar to that in the foregoing description.

As described above, since the buffer 3 on the input side and the buffer 5 on the output side can be managed respectively, it is applicable to an input buffer-type ATM switch or an output buffer-type ATM switch.

The WRR value is changed with an occurrence of cell disposal and the reading rate is distributed in a time division mode based on the changed value. Hence, a decrease in the processing capability of the processor due to a periodic information exchange can be suppressed to a minimum level.

Even if cell disposal occurs in a buffer, the reading rate is distributed according to the WRR value and in a time division mode, without ceasing the reading from a buffer with a low priority. That is, the reading band is decreased and the reading band of the input buffer in a cell disposal occurrence state is increased by the decreased component. Hence, it is avoided that cells excessively reside in a buffer with a low priority.

The WRR value can be changed in accordance with a command input to the control terminal 600 and the message regarding the change is automatically displayed on the control terminal. Hence, the operator can grasp when and how the priority (WRR) has changed.

The cell reading rate change function is started up in response to an occurrence of cell disposal in a buffer. However, the rate change function may be stared up in accordance with a difference between the maximum cell amount and a storage cell amount of a buffer. In this case, the buffer 3 or 5 monitors the remaining amount.

Figure 8:
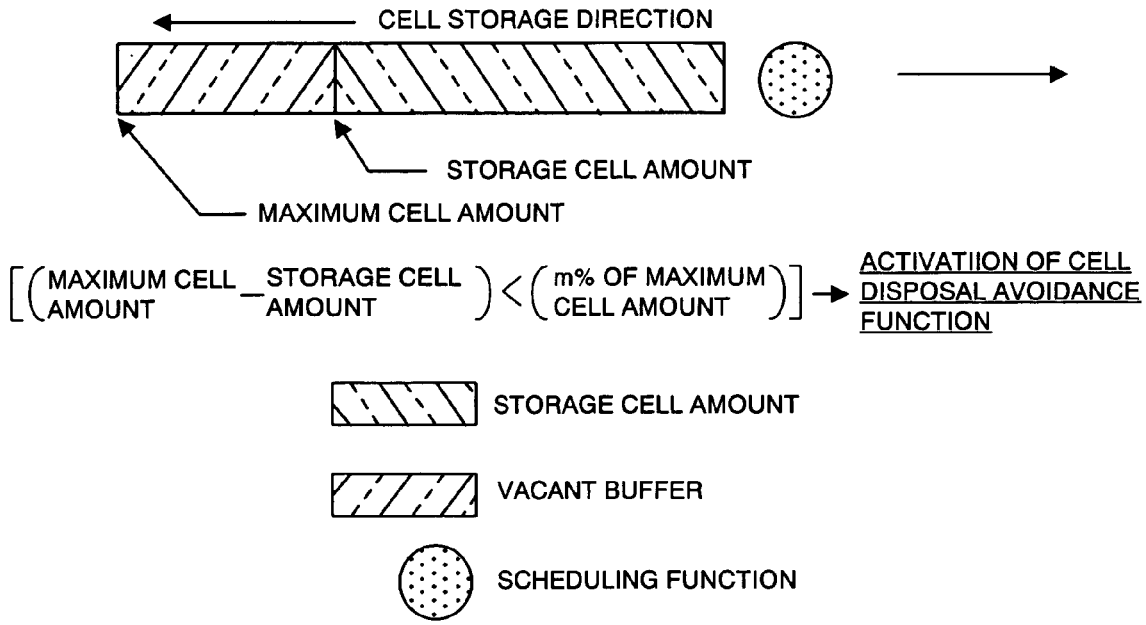
FIG. 8 is a diagram illustrating the triggering of a cell disposal avoidance system in accordance with a remaining cell amount.

That is, referring to FIG. 8, the cell reading rate changes at the stage that the remaining buffer amount (a difference between a maximum cell amount and a storage cell amount) drops to 10% of the maximum cell amount of a QoS buffer in the QoS class. The buffer 3 or 5 monitors a threshold of the cell number corresponding to 10%. When the cell number exceeds the threshold, the controller 1b is interrupted to start up the speed change function process. Thereafter, the cell reading rate is changed and the remaining amount reduces (e.g. to 20 or 30%). After the cell reading rate exceeds the threshold of the cell number corresponding to 10%, the buffer 3 or 5 detects that the cell reading rate has reached a threshold corresponding to 20% or 30%. The interrupt proceeds to the controller 11 to start up the rate change function process. In this case, for example, the WRR value corresponding to an initial value is set to 1. The WRR value corresponding to 20% (meaning that the remaining buffer amount is 10% of the maximum buffer amount) is set to 2. The WRR value corresponding to 10% is set to 3. The WRR value corresponding to 30% is set to 1 (like the initial value previously stored in the software data section 813). Regarding the sequence flow shown in FIG. 6, the rate change function process is handled similarly by substituting the detection of an occurrence of cell disposal lowered by 10%, 20% or 30% so that the WRR value is changed.

In that case, after the buffer 3 or 5 detects 30%, the cell reading rate is decreased stepwise and automatically every time the remaining buffer amount increases. Finally, the cell reading rate returns to the initial value. Even if the remaining buffer amount once increases and then decreases after the 30% detection by the buffer 3 or 5, the WRR value is changed stepwise. When the buffer capacity (cell amount) is once lowered less than 10% the WRR value changes stepwise till an occurrence of cell disposal returns to 30%. When the cell disposal generation reaches 30%, the WRR value returns to the initial value.

In other words, since the reading rate of the buffer is changed before an occurrence of cell disposal, the cell disposal can be avoided in advance.

In a manner similar to that at the cell disposal detection, the WRR value is changed with the buffer congestion alarm (generated when the difference between the maximum cell amount (buffer size) and the number of storage cells decreases less than a constant value). Based on the changed value, the reading rate is distributed in a time division mode. Hence, a decrease in the processor processing capability due to periodic information exchanges can be suppressed to a minimum level.

Figure 9:
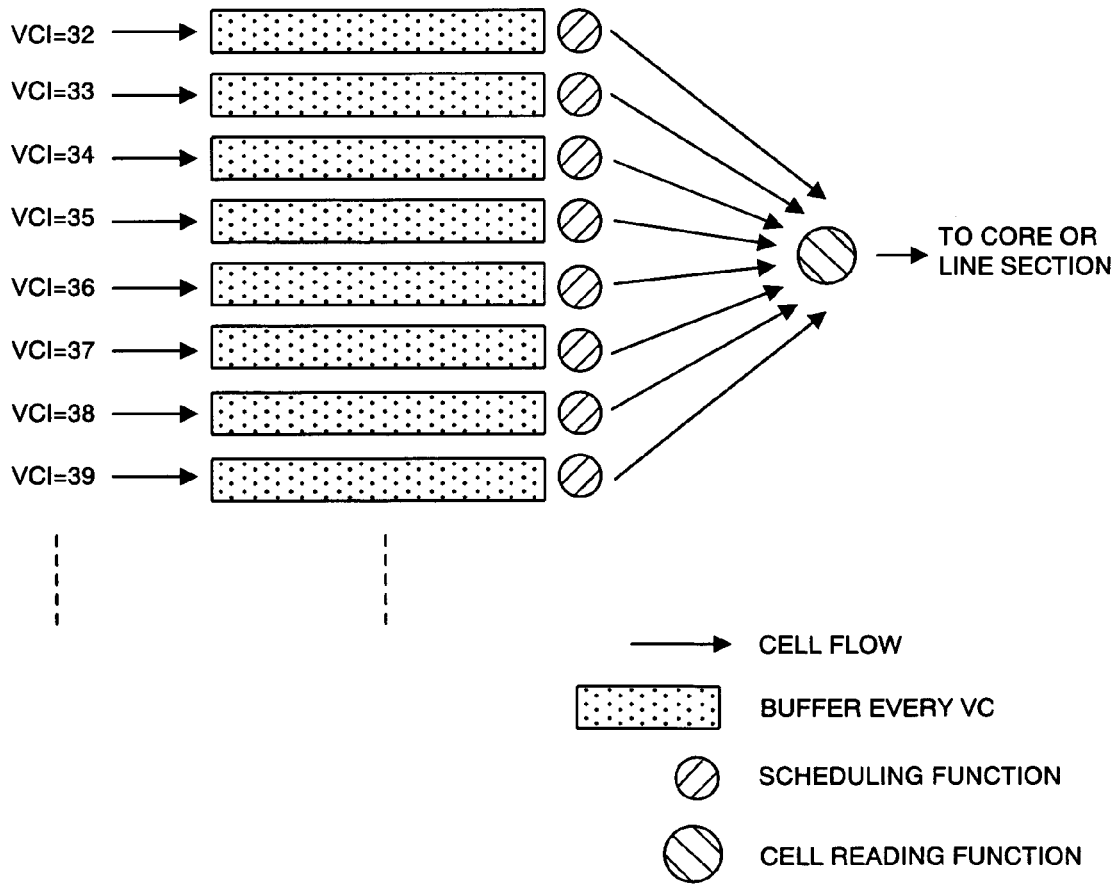
FIG. 9 is a diagram schematically illustrating the case where cells are read out of a buffer buffered every VC.

The present system can be employed even for Per VC queuing which implements buffering for every virtual connection (VC) shown in FIG. 9. In the above-mentioned embodiments, the cell reading is performed for every QoS class. However, the system that reads cells for each VC monitors the cell disposal for each VC.

That operation (including the previous prediction of cell disposal) can be easily realized because the QoS class is replaced with the VC identification number in the portion explained with FIGS. 1 to 8. That is, the disposal can be prevented controllably by speeding the cell reading rate of a VC Queue in a cell disposal occurrence state, As described above, according to the present invention, the buffer on the input side and the buffer on the output side can be managed respectively. Hence, the present invention is applicable to the input buffer-type ATM switch, the output buffer-type ATM switch, and the input/output buffer and ATM switch.

Moreover, according to the present invention, the WRR value is changed upon an occurrence of cell disposal or buffer congestion alarm and the reading speed is distributed in a time division mode based on the changed WRR value. Hence, a decrease in the processing capability of the processor due to periodical information exchanges can be suppressed to a minimum level.

According to the present invention, even if cell disposal occurs in a buffer, the reading rate is distributed in a time division mode in accordance with the WRR value, without interrupting the reading from a buffer with a low priority. Hence, it can be avoided that cells excessively reside in the buffer with a low priority.

Moreover, according to the present invention, the WRR value can be changed in accordance with the command input through the control terminal and a message is automatically indicated on the control terminal, upon the change of the WRR value. Hence, the operator can grasp when and how the WRR value has changed.

However, according to the present invention, the mechanism of speeding the cell reading rate of the QoS buffer in a congestion state changes the weight of a WRR value from the QoS buffer to temporarily increase the cell reading rate. Thus, the time during which the storage cell passes through the buffer can be shortened compared with the existing system. Hence, CTD (cell transfer delay) and CDV (cell delay variation) of connection set in the CBR class can be ensured even in congestion of the QoS buffer. Moreover, the present invention can ensure the CLR (cell disposal ratio) and maintain the service quality.

Moreover, because of the above-mentioned feature, the present invention ensures CTD of connection set in the rt-VBR service class. Moreover, the present invention can ensure the CLR and maintain the service quality.

Moreover, because of the above-mentioned feature, the present invention ensures CLR of connection set in the nrt-VBR service class. Moreover, the present invention can maintain the service quality.

Moreover, because of the above-mentioned feature, the present invention can suppress to a minimum level the CLR of the connection set in the UBR service class being a parameter not primarily needed to ensure the ATM Forum.

Moreover, because the reading rate of a buffer is changed before an occurrence of cell disposal, the present invention can avoid the cell disposal in advance.

The entire disclosure of Japanese Patent Application No. 11-336638 filed on Nov. 26, 1999 including specification, claims, drawing and summary are incorporated herein by reference in its entirety.

What is claimed is:

1. A cell disposal avoidance system in a buffer, said buffer including category buffers classified by category in an ATM switch, said category buffers each for storing a cell, said buffer reading out said cell, said system comprising:
   a weight representing a priority that determines the reading rate for each of said category buffers;
   a reader for laying out allocation in a time division mode according to said priority, said allocation being read out of each of said category buffers when a cell in a buffer is read out, and reading out said allocation in a round-robin format;
   a detector for detecting cell disposal of said buffer;
   a controller for changing to a higher weight a weight of the priority in a buffer in a cell disposal state detected by said detector;
   an informer for informing a maintenance terminal of the fact that said buffer in a cell disposal state has stopped its cell disposal; and
   a first resetting unit for resetting a weight representing the priority of said buffer in the cell disposal state by commands input by said maintenance terminal.

2. The cell disposal avoidance system defined in claim 1, further comprising a second resetting unit for resetting a weight representing the priority of the buffer when the cell disposal of said buffer stopped.

3. The cell disposal avoidance system in claim 1, wherein the higher weight of the priority and an initial priority are informed to the maintenance terminal.

4. The cell disposal avoidance system defined in claim 1, wherein said category represents the type of QoS class in accordance with a header within said cell and a cell path.

5. A cell disposal avoidance system in a buffer, said buffer including category buffers classified by category in an ATM switch, said category buffers each for storing a cell, said buffer reading out said cell, said system comprising:
   a priority mode representing a reading rate weight assigned to each of said category buffers;
   a reader for laying out allocation in a time division mode according to a priority, said allocation being read out of each of said category buffers when a cell in a buffer is read out, and reading out said allocation in a round-robin format;
   a detector for detecting the fact that the capacity of said buffer exceeds a first threshold; and
   a first controller for changing to a higher value the reading rate weight of a priority of a buffer when the detector detects that the first threshold has been exceeded; and
   when the capacity of a buffer exceeding said first threshold reaches a second threshold, lower than said first threshold, a first resetting unit resets a weight representing the priority of said buffer.

6. The cell disposal avoidance system defined in claim 5, further comprising, when the capacity of a buffer reaches a third threshold less than said second threshold, a second controller sets the priority of said buffer to a weight lower than that of said first controller.

7. The cell disposal avoidance system defined in claim 5, wherein the higher value of the weight of the priority changed by said first controller and an initial priority are informed to a maintenance terminal.

8. The cell disposal avoidance system defined in claim 5, wherein said category represents the type of QoS class in accordance with a header within said cell and a cell path.

9. A cell disposal avoidance system in a buffer, said buffer including category buffers classified by category in an ATM switch, said category buffers each for storing a cell, said buffer reading out said cell, said system comprising:
   a priority mode representing a reading rate weight assigned to each of said category buffers;
   a reader for laying out allocation in a time division mode according to a priority, said allocation being read out of each of said category buffers when a cell in a buffer is read out, and reading out said allocation in a round-robin format;
   a detector for detecting the fact that the capacity of said buffer exceeds a first threshold;
   a first controller for changing to a higher value the reading rate weight of a priority of a buffer when the detector detects that the first threshold has been exceeded;
   an informer for informing a maintenance terminal of the fact that the capacity of said buffer exceeding said first threshold reaches a second threshold; and
   a resetting unit for resetting the reading rate weight to a weight representing the priority of a buffer exceeding said first threshold, by a command input by said maintenance terminal.

10. A cell disposal avoidance method suitable in a buffer, said buffer including category buffers classified by category in an ATM switch, said category buffers for each for storing cells, said buffer reading out said cells, said method comprising:
   increasing a cell reading priority of a buffer in which cell disposal occurs due to congestion of said buffer;
   changing a period during which cells are read from a buffer in a cell disposal state, in accordance with the increased cell reading priority and a priority allocated to each of said category buffers, to speed the reading rate of said congested buffer; and
   when cell disposal occurs in a category buffer, informing a maintenance terminal of said increased cell reading priority and an initial value for the cell reading priority.

11. The cell disposal avoidance method defined in claim 10, further comprising:
   when said buffer in which cell disposal occurs stops cell disposal, resetting the cell reading priority of said buffer to the initial value; and
   resetting a period during which a cell is read out of each of said category buffers to an initial state, according to the priority allocated to each of said category buffers.

12. The cell disposal avoidance method defined in claim 10, further comprising when a buffer in a cell disposal state stops its cell disposal, informing said maintenance terminal of a cease of the cell disposal.

13. A cell disposal avoidance method suitable in a buffer, said buffer including category buffers classified by category in an ATM switch, said category buffers each for storing cells, said buffer reading out said cells, said method comprising:

increasing a cell reading priority of a buffer in which cell disposal occurs due to congestion of said buffer;

changing a period during which cells are read from a buffer in a cell disposal state, in accordance with the increased cell reading priority and a priority allocated to each of said category buffers, to speed the reading rate of said congested buffer;

when a maintenance terminal inputs a command for resetting the cell reading priority to an initial value after said maintenance terminal has received information on a cease of cell disposal, resetting to an initial value a cell reading priority of said buffer in a cell disposal halt state; and resetting a period during which a cell is read out of each of said category buffers, to an initial state, in accordance with a priority allocated to each of said category buffers.

14. The cell disposal avoidance method defined in claim 10, wherein said category represents the type of QoS class in accordance with a header within said cell and a cell path.

15. A cell disposal avoidance method suitable for a buffer, said buffer including category buffers classified by category in an ATM switch, said category buffers each for storing a cell, said buffer reading out said cell, said method comprising:

when the capacity of said buffer exceeds a first threshold, increasing a cell reading priority of said buffer;

changing a period during which a cell is read out of a buffer exceeding said first threshold, in accordance with a priority allocated to each of said category buffers, to speed a reading speed of said buffer in a cell disposal state;

when it is detected that the capacity of the buffer exceeding said first threshold reaches a second threshold, lower than said first threshold, resetting the cell reading priority of said buffer to an initial value; and resetting a period during which a cell is read out of each of said category buffers, to an original state, in accordance with a priority allocated to each of said category buffers.

16. The cell disposal avoidance method defined in claim 15, further comprising when the capacity of a buffer reaches a third threshold lower than said second threshold, setting a priority of said buffer to a threshold lower than a value set when the capacity of said buffer exceeds said first threshold.

17. A cell disposal avoidance method suitable for a buffer, said buffer including category buffers classified by category in an ATM switch, said category buffers each for storing a cell, said buffer reading out said cell, said method comprising:

when the capacity of said buffer exceeds a first threshold, increasing a cell reading priority of said buffer;

changing a period during which a cell is read out of a buffer exceeding said first threshold, in accordance with a priority allocated to each of said category buffers, to speed a reading speed of said buffer in a cell disposal state; and when a category buffer exceeds said first threshold, informing a maintenance terminal of the increased cell reading priority and an initial value of the cell reading priority.

18. The cell disposal avoidance method defined in claim 15, further comprising when a buffer exceeding said first threshold stops exceeding a second threshold, lower than said first threshold, informing a maintenance terminal of the fact that said buffer has ceased cell disposal.

19. The cell disposal avoidance method defined in claim 18, further comprising:

when said maintenance terminal inputs a command for resetting the cell reading priority to an initial value after said maintenance terminal has received information on a cease of exceeding said second threshold, lower than said first threshold; and resetting a period during which a cell is read out of each of said category buffers, to an original value, in accordance with a priority of each of said category buffers.

20. The cell disposal avoidance method defined in claim 15, wherein said category represents the type of QoS class in accordance with a header within said cell and a cell path.

* * * * *